(12) United States Patent
Bu et al.

(10) Patent No.: US 11,454,371 B2
(45) Date of Patent: Sep. 27, 2022

(54) LIGHT DISTRIBUTING COMPONENT, LIGHT SOURCE MODULE, LAWN LAMP CAP AND LAWN LAMP

(71) Applicant: OPPLE LIGHTING CO., LTD., Shanghai (CN)

(72) Inventors: Chenxi Bu, Shanghai (CN); Feng Li, Shanghai (CN); Youfen Chen, Shanghai (CN); Xuejun Feng, Shanghai (CN); Hongbo Wang, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 17/126,450

(22) Filed: Dec. 18, 2020

(65) Prior Publication Data

US 2021/0102684 A1 Apr. 8, 2021

Related U.S. Application Data

(63) Continuation of application No. PCT/CN2019/092319, filed on Jun. 21, 2019.

(30) Foreign Application Priority Data

Jun. 22, 2018 (CN) .......................... 201810651431.2
Jun. 22, 2018 (CN) .......................... 201820968626.5

(51) Int. Cl.
*F21V 5/04* (2006.01)
*F21S 8/08* (2006.01)
(Continued)

(52) U.S. Cl.
CPC .............. *F21V 5/045* (2013.01); *F21S 8/081* (2013.01); *F21V 23/003* (2013.01); *F21V 31/005* (2013.01)

(58) Field of Classification Search
CPC ...... F21V 5/045; F21V 23/003; F21V 31/005; F21V 7/0008; F21V 3/04; G02B 19/0028;
(Continued)

(56) References Cited

U.S. PATENT DOCUMENTS 8,272,768 B2 9/2012 Kazmierski et al.
2015/0016097 A1 1/2015 Martzall

FOREIGN PATENT DOCUMENTS

CN 102252264 A 11/2011
CN 203489138 U 3/2014
(Continued)

OTHER PUBLICATIONS

International Search Report of PCT Application No. PCT/CN2019/092319 dated Sep. 29, 2019, (6p).

*Primary Examiner* — Kevin Quarterman
(74) *Attorney, Agent, or Firm* — Arch & Lake LLP

(57) ABSTRACT

The present disclosure discloses a light distributing component, a light source module, a lawn lamp cap and a lawn lamp. The light distributing component includes an inner ring polarizing lens and an outer ring polarizing lens, and the inner ring polarizing lens and the outer ring polarizing lens have a common axis center, and the outer ring polarizing lens surrounds the inner ring polarizing lens, the inner ring polarizing lens is configured to deflect light of a light-emitting unit toward a direction close to the axis center; and the outer ring polarizing lens is configured to deflect light of the light-emitting unit in a direction away from the axis center.

20 Claims, 7 Drawing Sheets

(51) Int. Cl.
  *F21V 23/00*    (2015.01)
  *F21V 31/00*    (2006.01)
(58) Field of Classification Search
  CPC ... G02B 19/0047; G02B 27/286; F21S 8/081;
              F21W 2131/109; F21Y 2103/33
  See application file for complete search history.

(56) References Cited

FOREIGN PATENT DOCUMENTS

| | | | |
|---|---|---|---|
| CN | 203615246 U | | 5/2014 |
| CN | 104747960 A | | 7/2015 |
| CN | 107631271 A | | 1/2018 |
| CN | 107654860 A | * | 2/2018 |
| CN | 107654860 A | | 2/2018 |
| CN | 108591896 A | | 9/2018 |
| CN | 208222267 U | | 12/2018 |
| KR | 20100045639 A | | 5/2010 |

* cited by examiner

102

LIGHT DISTRIBUTING COMPONENT, LIGHT SOURCE MODULE, LAWN LAMP CAP AND LAWN LAMP

CROSS-REFERENCE TO RELATED APPLICATIONS

This application is based upon and claims the priority of PCT patent application No. PCT/CN2019/092319 filed on Jun. 21, 2019 which claims priority to the Chinese patent application No. 201810651431.2 filed on Jun. 22, 2018 and the Chinese patent application No. 201820968626.5 filed on Jun. 22, 2018, the entire content of all of which is hereby incorporated by reference herein for all purposes.

TECHNICAL FIELD

The present disclosure relates to a lighting field, and more particularly, to a light distributing component, a light source module, a lawn lamp cap and a lawn lamp.

BACKGROUND

Lawn lamps on the market are generally divided into two light-emitting modes: one is a direct light-emitting mode, in which a light source module usually emits light from a top of the lawn lamp to a direction substantially perpendicular to a bottom surface, and light is concentrated around the lawn lamp; and the other is a 360-degree light-emitting mode, in which light diffuses 360 degrees all around with the lawn lamp as a center.

SUMMARY

The present disclosure provides a light distributing component, a light source module, and a lawn lamp cap.

According to a first aspect, the present disclosure provides a light distributing component. The light distributing component may include an inner ring polarizing lens and an outer ring polarizing lens.

The inner ring polarizing lens and the outer ring polarizing lens may have a common axis center, and the outer ring polarizing lens may surround the inner ring polarizing lens; the inner ring polarizing lens may be configured to deflect light of a light-emitting unit toward a direction close to the axis center, a midline of an illumination range of the inner ring polarizing lens and the axis center may form a first included angle, and the first included angle may be an acute angle; the outer ring polarizing lens may be configured to deflect light of the light-emitting unit in a direction away from the axis center, a midline located in an illumination range of the outer ring polarizing lens and the axis center may form a second included angle, and the second included angle may be an acute angle.

According to a second aspect, the present disclosure provides a light source module. The light source module may include a substrate, light-emitting units and a light distributing component. The light distributing component may include an inner ring polarizing lens and an outer ring polarizing lens.

The inner ring polarizing lens and the outer ring polarizing lens may have a common axis center, and the outer ring polarizing lens may surround the inner ring polarizing lens; the inner ring polarizing lens may be configured to deflect light of a light-emitting unit toward a direction close to the axis center, a midline of an illumination range of the inner ring polarizing lens and the axis center may form a first included angle, and the first included angle may be an acute angle; the outer ring polarizing lens may be configured to deflect light of the light-emitting unit in a direction away from the axis center, a midline located in an illumination range of the outer ring polarizing lens and the axis center may form a second included angle, and the second included angle may be an acute angle; the substrate may have a first surface and a second surface that face away from each other, and the light-emitting units may be arranged in a ring shape on the first surface; and the light distributing component may cover the first surface; and the inner ring polarizing lens and/or the outer ring polarizing lens may distribute light of the light-emitting units.

According to a third aspect, the present disclosure provides a lawn lamp cap. The lawn lamp cap may include a top cover, a base and a light source module. The light source module may include a substrate, light-emitting units and a light distributing component. The light distributing component comprises an inner ring polarizing lens and an outer ring polarizing lens.

The inner ring polarizing lens and the outer ring polarizing lens may have a common axis center, and the outer ring polarizing lens may surround the inner ring polarizing lens; the inner ring polarizing lens may be configured to deflect light of a light-emitting unit toward a direction close to the axis center, a midline of an illumination range of the inner ring polarizing lens and the axis center may form a first included angle, and the first included angle may be an acute angle; the outer ring polarizing lens may be configured to deflect light of the light-emitting unit in a direction away from the axis center, a midline located in an illumination range of the outer ring polarizing lens and the axis center may form a second included angle, and the second included angle may be an acute angle.

The substrate may have a first surface and a second surface that face away from each other, and the light-emitting units may be arranged in a ring shape on the first surface; and the light distributing component may cover the first surface; and the inner ring polarizing lens and/or the outer ring polarizing lens may distribute light of the light-emitting units; and the top cover and the base may be arranged opposite to each other; a region enclosed by the top cover and the base may be a light source cavity; the light source module may be arranged at an end of the light source cavity that is close to the top cover; and a first surface may face the base.

It is to be understood that both the foregoing general description and the following detailed description are exemplary and explanatory only and are not restrictive of the present disclosure.

BRIEF DESCRIPTION OF THE DRAWINGS

The accompanying drawings described herein are used to provide a further understanding of the present disclosure, constitute a portion of the present disclosure. An example and description of the present disclosure are used to explain the present disclosure and do not constitute an improper limitation of the application. In the accompanying drawings.

DETAILED DESCRIPTION

Figure 1:
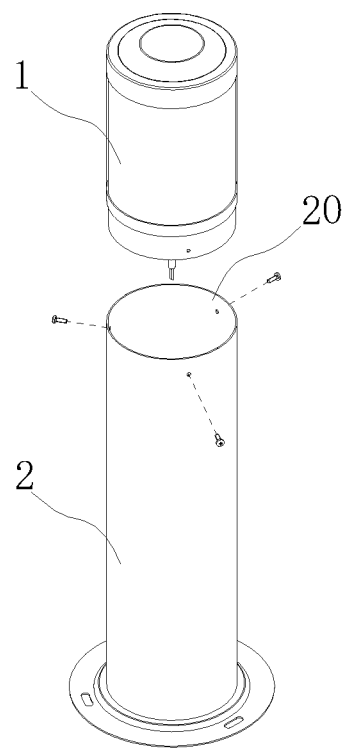
FIG. 1 is an exploded view of a lawn lamp having a cylindrical lampshade disclosed by an example of the present disclosure.
Figure 2:
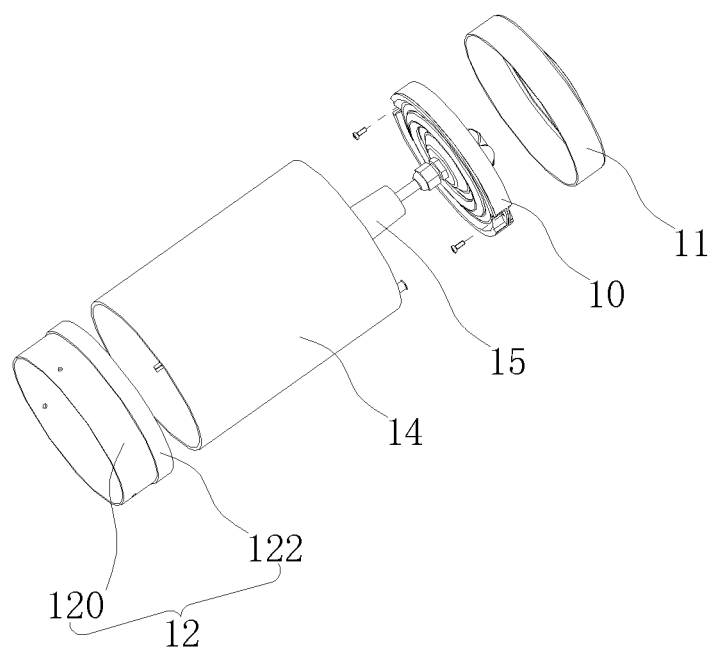
FIG. 2 is an exploded view of a lawn lamp cap in FIG. 1.
Figure 3:
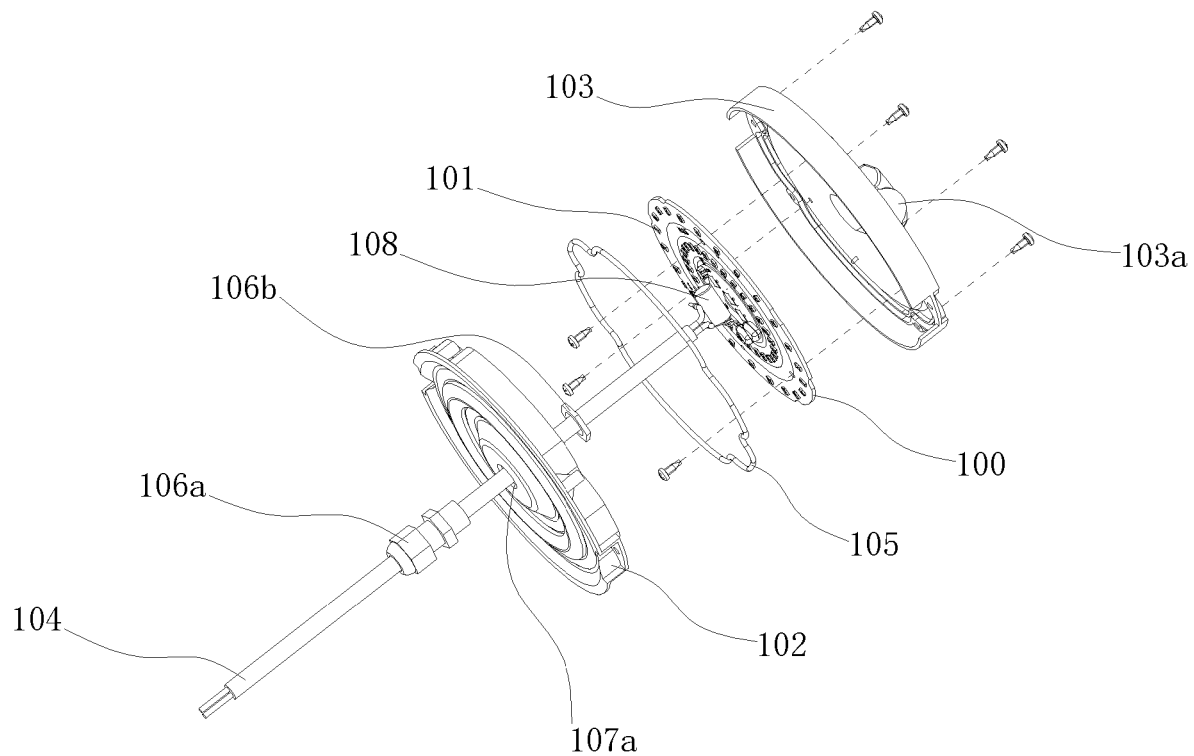
FIG. 3 is an exploded view of a light source module in FIG. 2.
Figure 4:
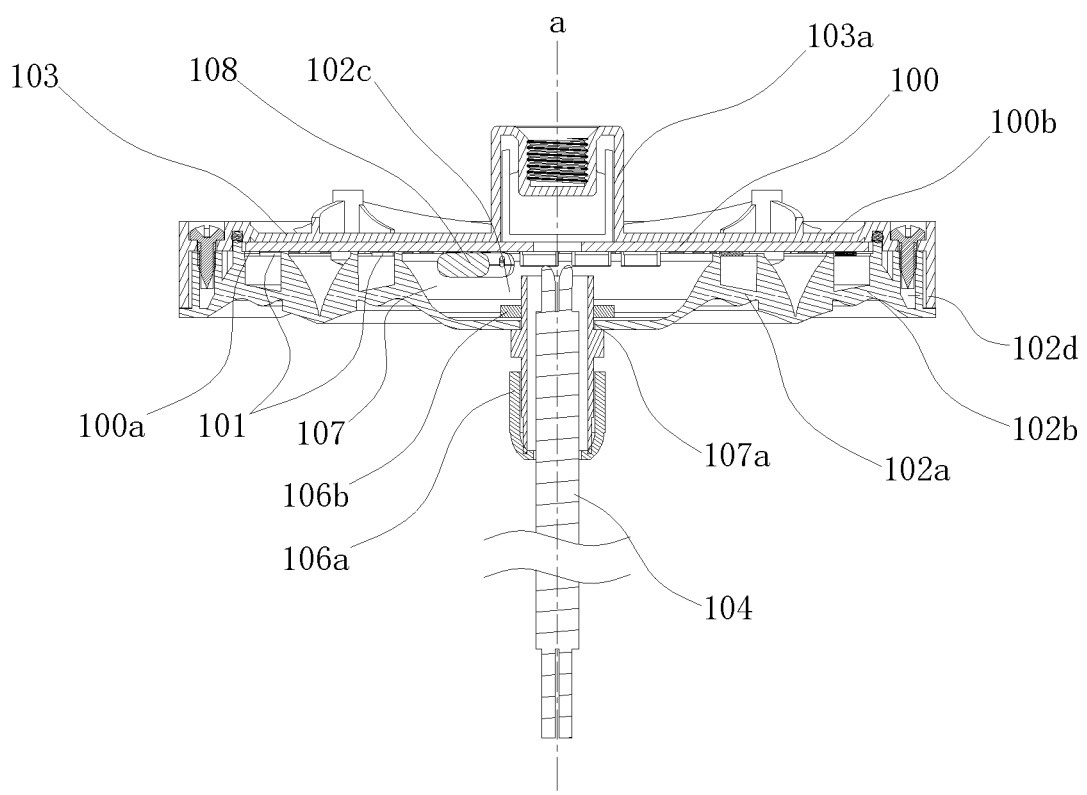
FIG. 4 is a cross-sectional view of the light source module in FIG. 3.
Figure 5:
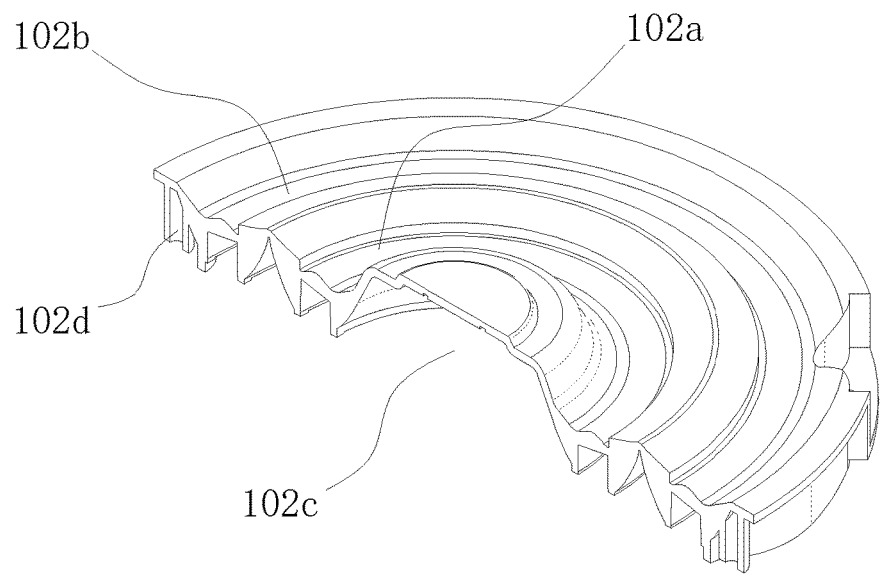
FIG. 5 is a cross-sectional perspective view of a light distributing component disclosed by an example of the present disclosure.

Technical solution and advantages of the examples of the disclosure, the technical solutions of the present disclosure are described in connection with the examples of the present disclosure and the corresponding drawings. The described examples are just a part but not all of the examples of the present disclosure. Based on the examples of the present disclosure, those skilled in the art can obtain other example(s), without any inventive work, which should be within the scope of the disclosure.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Description of reference numerals used in this disclosure may include:

1—lawn lamp cap, 10—light source module, 100—substrate, 100a—first surface, 100b—second surface, 101—light-emitting unit, 102—light distributing component, 102a—inner ring polarizing lens, 102b—outer ring polarizing lens, 102c—first accommodating portion, 102d—mounting portion, 103—bottom cover, 103a—wiring portion, 104—cable, 105—seal ring, 106—waterproof member, 106a—waterproof joint, 106b—waterproof joint nut, 107—assembly cavity, 107a—cable opening, 108—power drive module, 11—top cover, 12—base, 120—insertion end, 122—stopper; 13—light source cavity, 14—cylindrical lampshade, 15—decorative column/reflector, 150—first line channel, 16—support member, 160—second line channel; 2—lamp body, 20—sleeve-joint hole; a—axis center, b1—midline, b2—midline.

For the direct light-emitting mode of lawn lamps, a light source module of a direct type is usually adopted, that is, the light source module is arranged on the top of the lawn lamp, a substrate used therein has a tabulate shape, all light-emitting units are arranged on a side of the substrate that faces the ground, and light emitted by all the light-emitting units in the light source module is all substantially perpendicular to the bottom surface. With respect to the 360-degree uniform light-emitting mode of lawn lamps, a rod-shaped light source module is usually adopted, that is, the light source module as a whole has a rod-shaped structure, an axis of the rod-shaped structure is perpendicular to the bottom surface, and the light-emitting units are arranged along a circumferential direction around the axis of the rod-shaped structure to implement uniform light-emitting within a range of 360 degrees. It can be seen that, the light source modules inside the two types of lawn lamps have completely different structures and cannot be used universally. Manufacturers have to produce two types of light source modules at a same time, causing high production costs.

An example of the present disclosure discloses a lawn lamp, as shown in FIG. 1 to FIG. 13, comprising a lawn lamp cap 1 and a lamp body 2, wherein, the lawn lamp cap 1 is a light-emitting portion of the lawn lamp, and integrates a plurality of components including a light source module 10, a top cover 11 and a base 12; and the lamp body 2 is a main body supporting structure, which is mainly used to lift the lawn lamp cap 1 to a certain height and fix the lawn lamp cap 1. The lawn lamp cap 1 and the lamp body 2 may be fixed to each other by detachable connection, which is convenient for replacement. For example, a sleeve-joint hole 20 may be formed at a top end of the lamp body 2; an end of the base 12 that faces away from the top cover 11 is an insertion end 120; the insertion end 120 may be inserted into the sleeve-joint hole 20; and meanwhile, a ring-shaped or other form of stopper 122 may be arranged on a circumferential surface of the base 12, so when the insertion end 120 is inserted into the sleeve-joint hole 20, an edge of the sleeve-joint hole 20 abuts against the stopper 122 to support the base 12.

Referring to FIG. 3 to FIG. 6, the light source module 10 according to the example comprises a substrate 100, light-emitting units 101, and a light distributing component 102; the substrate 100 is usually a Printed Circuit Board (PCB), which has a first surface 100a and a second surface 100b that face away from each other; the light-emitting units 101 are arranged in a ring shape on the first surface 100a; light emitted by the light-emitting unit 101 itself will propagate outward in a hemispherical shape from the first surface 100a. Such a light propagating mode cannot meet lighting requirements of the lawn lamp, so it is necessary to distribute light emitted by the light-emitting unit 101 through the light distributing component 102.

The light distributing component 102 covers the first surface 100a; the light distributing component 102 has an overall transparent configuration; the light distributing component 102 comprises an inner ring polarizing lens 102a and an outer ring polarizing lens 102b; the inner ring polarizing lens 102a and the outer ring polarizing lens 102b are arranged coaxially, that is, the inner ring polarizing lens 102a and the outer ring polarizing lens 102b have a common axis center a, and the two form a concentric ring structure, wherein, the outer ring polarizing lens 102b surrounds the inner ring polarizing lens 102a.

Referring to FIG. 5 to FIG. 8, the inner ring polarizing lens 102a and the outer ring polarizing lens 102b are both polarizing lenses, that is, they can deflect the light in the hemispherical shape emitted by the light-emitting unit 101 to propagate substantially toward one direction or angle range. The inner ring polarizing lens 102a is used to deflect light of the light-emitting unit 101 toward a direction close to the axis center a, wherein, after light emitted by a single light-emitting unit 101 is deflected by the inner ring polarizing lens 102a, the deflected light formed thereby has a certain angle range, which may be understood as an illumination range, the illumination range has a midline b1, the midline b1 and the axis center a form a first included angle α, and the first included angle α is an acute angle.

The outer ring polarizing lens 102b is used to deflect light of the light-emitting unit 101 toward a direction away from the axis center a; similarly, after light emitted by a single light-emitting unit 101 is deflected by the outer ring polarizing lens 102b, the deflected light formed thereby also has a certain illumination range, the illumination range has a midline b2, the midline b2 and the axis center a form a second included angle β, and the second included angle β is also an acute angle.

In the lawn lamp cap 1, the top cover 11 and the base 12 are arranged opposite to each other, and a region enclosed by the two is a light source cavity 13, wherein, the light source module 10 is arranged at an end of the light source cavity 13 that is close to the top cover 11, and during arrangement, the first surface 100a should be ensured to face the base 12. The top cover 11 itself may have a certain accommodating region; and the light source module 10 may be located in the accommodating region, so that the light source module 10 may not be exposed from a region between the top cover 11 and the base 12. After assembled, the lawn lamp cap 1 may be fixedly connected with the lamp body 2 through the base 12, so that the lawn lamp cap 1 is located at a suitable height. Usually, the lawn lamp cap 1 also includes a cylindrical lampshade 14; and two ends of the cylindrical lampshade 14 are respectively connected with the top cover 11 and the base 12.

Figure 6:
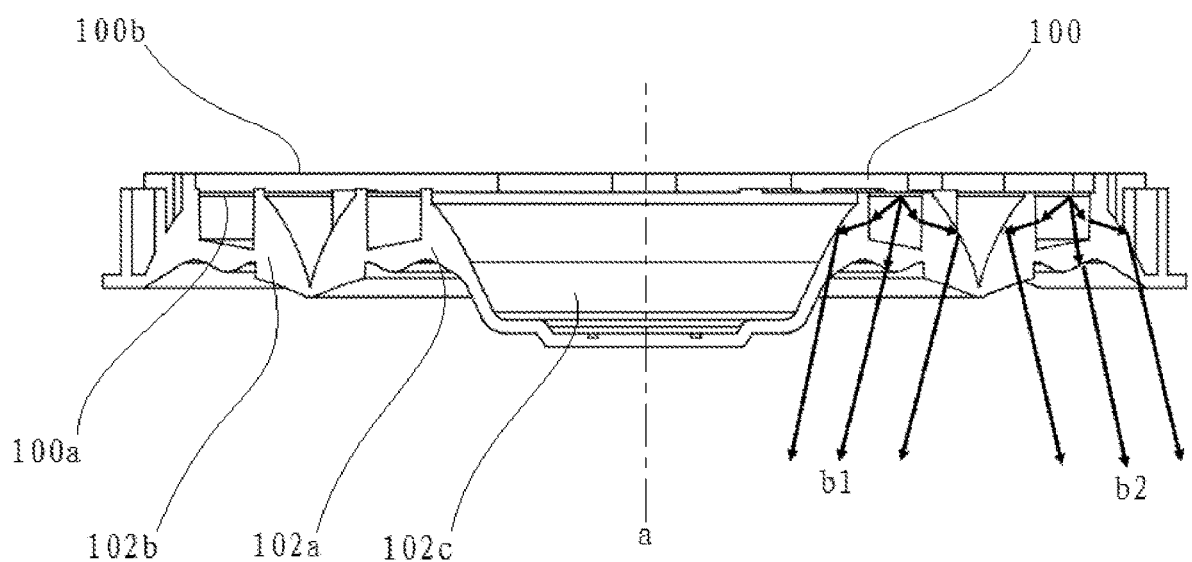
FIG. 6 is a light distribution view of a light source module disclosed by an example of the present disclosure.
Figure 7:
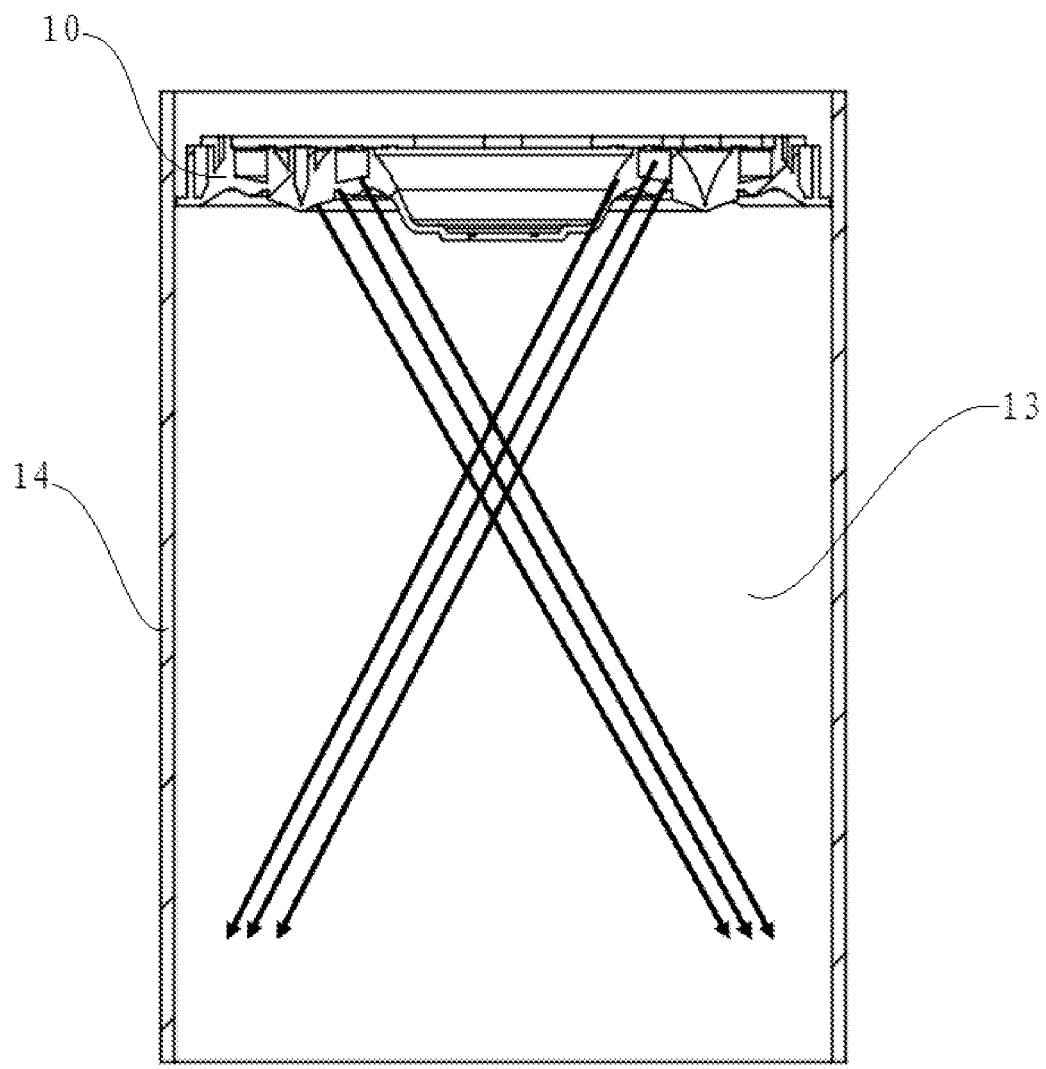
FIG. 7 is an optical path propagation diagram of an inner ring polarizing lens of a light source module disclosed by an example of the present disclosure.

Referring to FIG. 6 and FIG. 7, after light of the light-emitting unit 101 is distributed by the inner ring polarizing lens 102a, the light will be deflected toward the direction close to the axis center a, wherein, a portion with a strongest light intensity will be concentrated near a first deflected light b1, so the light deflected by the inner ring polarizing lens 102a will mainly irradiate to an end inside the light source cavity 13 that is adjacent to the base 12 at the first included angle α and approximate angles with the axis center a, and these light rays will be mainly emitted out of a region of the cylindrical lampshade 14 that is close to the base 12. Meanwhile, since the inner ring polarizing lens 102a deflects light in a cone-shaped diffusion manner, some light of the light-emitting unit 101 will also irradiate to a middle portion of the light source cavity 13, and the portion of light is mainly emitted out of a central region of the cylindrical lampshade 14. In addition, there is still a small portion of light irradiating to an end of the light source cavity 13 that is adjacent to the top cover 11, and the portion of light will mainly be emitted out of a region of the cylindrical lampshade 14 that is close to the top cover 11.

The end of the cylindrical lampshade 14 that is adjacent to the base 12 has a farthest distance from the light-emitting unit 101, causing greatest light loss in the propagation process; while a region of the cylindrical lampshade 14 that is closer to the top cover 11 is also closer to the light-emitting unit 101, causing less light loss. In this example, toward a position having a farthest distance from the light-emitting unit 101, the inner ring polarizing lens 102a projects light with a greatest intensity; while as the distance gets closer, the light intensity gradually decreases; so, the inner ring polarizing lens 102a may diffuse light emitted by the light-emitting unit 101 uniformly onto the cylindrical lampshade 14, so as to implement a 360-degree uniform light-emitting mode.

With respect to a size of a commonly-used cylindrical lampshade 14, the first included angle α is preferably 10° to 15°, so that main light rays may intersect with each other inside the light source cavity 13 and then directly irradiate to the region of the cylindrical lampshade 14 that is adjacent to the base 12, rendering a better light uniformity effect.

With further reference to FIG. 6, after light of the light-emitting unit 101 is distributed by the outer ring polarizing lens 102b, light will be deflected toward the direction away from the axis center a, wherein, a portion of light with a strongest light intensity will be concentrated near a second deflected light b2, so the light deflected by the outer ring polarizing lens 102b will mainly irradiate to the cylindrical lampshade 14 at the second included angle β and approximate angles with the axis center a, and passes through the cylindrical lampshade 14 to irradiate onto the ground around the lawn lamp. By adjusting a structure of the outer ring polarizing lens 102b, the second included angle β may be adjusted, to further adjust an irradiation range around the lawn lamp. Under normal circumstances, the second included angle β is preferably 10° to 15°, so that the light will be concentrated in a relatively small region around the lawn lamp, with an effect substantially the same as that of an ordinary direct irradiating mode.

Therefore, the light source module 10 according to the example can not only satisfy the 360-degree uniform irradiating mode, but also satisfy the direct irradiating mode. During production, only such type of light source module 10 needs to be produced, for use in two types of lawn lamps at a same time, which greatly saves investment costs of a production line.

It can be seen from the above introduction that, the 360-degree uniform light-emitting mode is mainly implemented by the inner ring polarizing lens 102a, so in the 360-degree uniform light-emitting mode, the outer ring polarizing lens 102b may be in an inoperative state, that is, the light-emitting unit 101 whose light is distributed by the outer ring polarizing lens 102b may be in an off state. Moreover, if some lawn lamps only need to have the 360-degree uniform light-emitting mode without the direct light-emitting mode, then at an ex-factory stage, the light-emitting unit 101 cooperating with the outer ring polarizing lens 102b may not be assembled, but only the light-emitting unit 101 cooperating with the inner ring polarizing lens 102a is assembled to save costs. At this time, all the light-emitting units 101 in the light source module 10 have light distributed by the inner ring polarizing lens 102a. In addition, in order to further improve illumination uniformity of the cylindrical lampshade 14, at this time, the cylindrical lampshade 14 may adopt a diffusion shade.

Similarly, the direct light-emitting mode of the light source module 10 according to the example is mainly implemented by the outer ring polarizing lens 102b, so in the direct light-emitting mode, the inner ring polarizing lens 102a may be in an inoperative state, that is, the light-emitting unit 101 whose light is distributed by the inner ring polarizing lens 102a may be in an off state. Moreover, if some lawn lamps only need to have the direct light-emitting mode without the 360-degree uniform light-emitting mode, then at an ex-factory stage, the light-emitting unit 101 cooperating with the inner ring polarizing lens 102a may not be assembled, but only the light-emitting unit 101 cooperating with the outer ring polarizing lens 102b is assembled to save costs. At this time, all the light-emitting units 101 in the light source module 10 have light distributed by the outer ring polarizing lens 102b. Further, the direct light-emitting mode needs to illuminate the ground, and thus puts forward relatively high requirements for the light intensity. At this time, if the cylindrical lampshade 14 adopts the diffusion shade, the light intensity will be greatly weakened, so a cylindrical lampshade 14 made of a transparent material is recommended.

In this example, the inner ring polarizing lens 102a and the outer ring polarizing lens 102b may also function at a same time, that is, some of the light-emitting units 101 have light distributed by the inner ring polarizing lens 102a, while the other light-emitting units 101 have light distributed by the outer ring polarizing lens 102b, so that the lawn lamp presents the direct light-emitting mode and the 360-degree uniform light-emitting mode at a same time.

Usually, the 360-degree uniform light-emitting mode is more for an aesthetics purpose, so the light-emitting unit 101 whose light is distributed by the inner ring polarizing lens 102a may emit colored light to improve aesthetics. As for the lawn lamp in the direct light-emitting mode, it mainly projects light of a single color to the ground, so such type of lawn lamp has poor aesthetics. Because of structural characteristics of the light source module 10 according to the example, aesthetics of the lawn lamp in the direct light-emitting mode may be improved.

Figure 8:
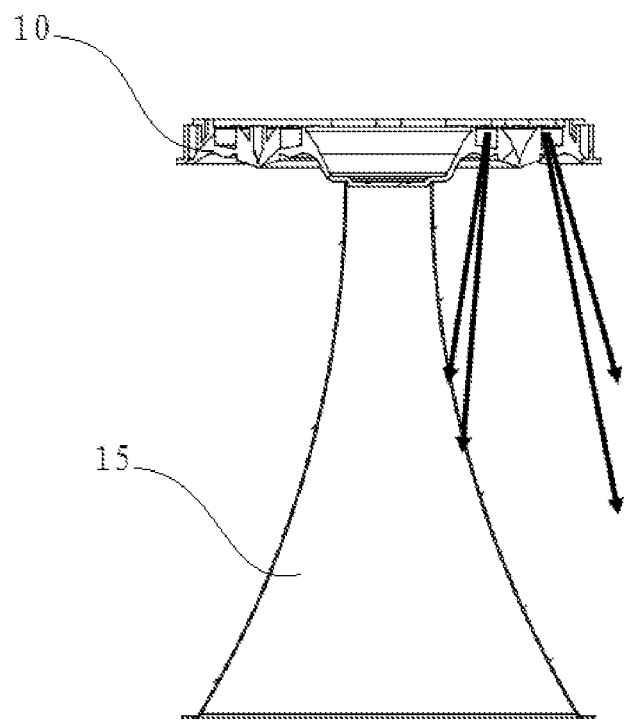
FIG. 8 is an optical path propagation diagram of an inner ring polarizing lens and an outer ring polarizing lens of a light source module disclosed by an example of the present disclosure.
Figure 9:
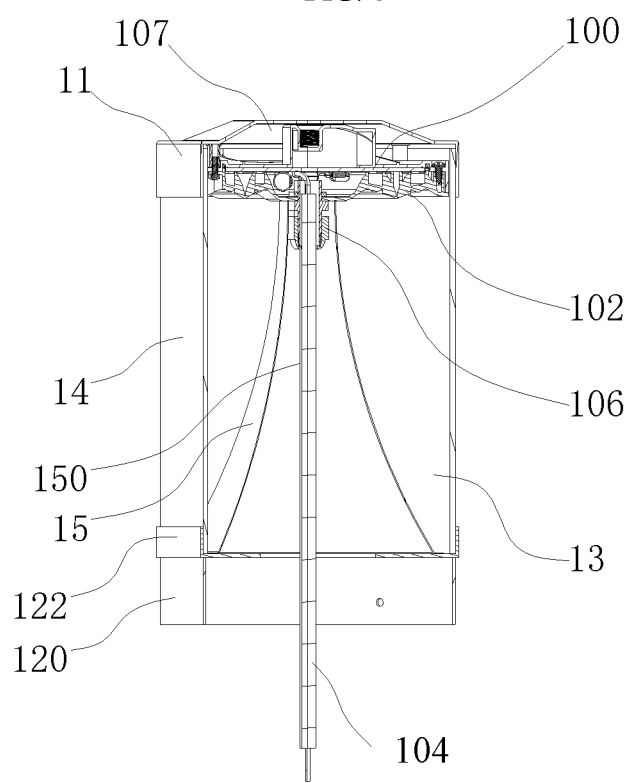
FIG. 9 is a cross-sectional view of a lawn lamp cap in FIG. 1.

As shown in FIG. 8, a decorative column 15 may be arranged in the light source cavity 13; the decorative column 15 is located between the light distributing component 102 and the base 12; and the decorative column 15 may have some beautifully shaped structures. The colored light emitted out of the inner ring polarizing lens 102a can irradiate to the decorative column 15; when people observe the decorative column 15 from a distance, a colored light effect of the decorative column 15 may be seen, which, when cooperating with the structure of the decorative column 15 at a same time, improves overall aesthetics. For example, the decorative column 15 as a whole may be a reflector; and a size of the reflector 15 (whose reference sign follows a reference sign of the decorative column below for ease of description) in a radial direction of the axis center a is tapered from an end close to the base 12 to an end close to the light distributing component 102. The reflector 15 can mix light emitted out of the inner ring polarizing lens 102a through its own configuration, so that colored light presents on a surface of the reflector 15. A surface of the reflector 15 preferably adopts a diffuse reflecting surface to improve a light mixing effect. In addition, the reflector 15 may have a horn shape, which shape is closer to nature and more in harmony with an environment.

As shown in FIG. 3, FIG. 4, FIG. 11 and FIG. 12, the light source module 10 according to the example further comprises a bottom cover 103 and a cable 104; and the bottom cover 103 and the light distributing component 102 jointly enclose to form an assembly cavity 107. The light distributing component 102 and the bottom cover 103 may be connected by bonding or other means; a more preferred solution is to provide a mounting portion 102d on the light distributing component 102; the mounting portion 102d is arranged around the outer ring polarizing lens 102b; the mounting portion 102d may be a threaded hole; and a screw passes through the bottom cover 103 to be in threaded connection with the threaded hole, thereby completing fixed connection between the light distributing component 102 and the bottom cover 103.

The substrate 100 and the light-emitting unit 101 are both arranged in the assembly cavity 107; usually, the light source module 10 may further comprise a power drive module 108 electrically connected with the substrate 100, and at this time, the power drive module 108 is also arranged within the assembly cavity 107. The power drive module 108 may be arranged on the first surface 100a or on the second surface 100b.

When the power drive module 108 is arranged on the first surface 100a, in order to accommodate the power drive module 108, the light distributing component 102 according to the example may be provided thereon with a first accommodating portion 102c; and the inner ring polarizing lens 102a surrounds the first accommodating portion 102c. When the light distributing component 102 and the bottom cover 103 jointly enclose to form the assembly cavity 107, the first accommodating portion 102c is a portion of the assembly cavity 107, and the power drive module 108 is located within the first accommodating portion 102c.

Based on a same principle, when the power drive module 108 is arranged on the second surface 100b, in order to accommodate the power drive module 108, in this example, the bottom cover 103 may also be provided thereon with a second accommodating portion (not shown) for accommodating the power drive module 108, and no details will be repeated here.

The assembly cavity 107 is opened with a cable opening 107a in communication with the outside; and the cable 104 extends into the assembly cavity 107 from the cable opening 107a and is electrically connected with the substrate 100 and the power drive module 108.

Because lawn lamps are mounted outdoors, waterproofing needs to be considered. The traditional lawn lamp usually has a whole lamp or a whole lamp cap waterproofed, that is, joints between the main external components of the lawn lamp, especially the structures for assembling the light source module 10 all adopt waterproof structures, while the light source module 10 itself does not adopt any waterproof structure, and dryness of the internal light source module 10 is ensured by the external waterproof structures. However, due to various structural styles of lawn lamps, if the external waterproof mode is used, a separate waterproof structure has to be designed with respect to each style of lawn lamp, causing high design and production costs.

In fact, a main electric part inside the lawn lamp is just the light source module 10; and other components such as the top cover 11, the base 12 and the cylindrical lampshade 14 as well as an internal empty region of the light source cavity 13 do not need to be waterproofed, so in the example, in order to reduce costs, the light source module 10 is directly designed to have a waterproof structure. As shown in FIG. 3, FIG. 4, FIG. 11 and FIG. 12, the light source module 10 further comprises a seal ring 105 and a waterproof member 106.

With respect to the light source module 10, these electric parts such as the substrate 100, the light-emitting unit 101, an end of the cable 104, and the power drive module 108 are the core of waterproofing, and these structures or components are all located inside the assembly cavity 107, so normal use of the light source module 10 can be ensured as long as the assembly cavity 107 is well waterproofed. In this example, a joint between the bottom cover 103 and the light distributing component 102 is sealed by the seal ring 105; for aesthetic reasons, edges of the bottom cover 103 and the light distributing component 102 may have various shapes; and in order to ensure a sealing effect, the seal ring 105 should conform to a shape of the joint between the bottom cover 103 and the light distributing component 102. The seal ring 105 may be made of commonly-used rubber or other similar material. Meanwhile, a gap between the cable 104 and the cable opening 107a is sealed by the waterproof member 106.

According to structural differences of lawn lamps, the cable opening 107a may be opened in different positions. For example, the cable opening 107a may be opened on the first accommodating portion 102c (referring to FIG. 3 and FIG. 4), and an axis of the cable opening 107a is parallel or even coaxial with the axis center a. The cable 104 extends from underground into the lamp body 2, successively passes through the base 12, the light source cavity 13 and the cable opening 107a, and enters the assembly cavity 107 to connect the substrate 100 and the power drive module 108. When the decorative column 15 is provided between the top cover 11 and the base 12, a first line channel 150 extending along a direction of the axis center a may be provided in the middle of the decorative column 15; and the cable 104 may be hidden inside the decorative column 15 after passing through the cable opening 107a (referring to FIG. 9), and reaches the base 12 through the first line channel 150. Since the light distributing component 102 has relatively large available space in the middle, the waterproof member 106 may be a waterproof joint 106a and a waterproof joint nut 106b with a better waterproof effect; the waterproof joint 106a is sleeved on the periphery of the cable 104 and extends from the cable opening 107a into the assembly cavity 107; the waterproof joint nut 106b is in threaded connection with the waterproof joint 106a inside the assembly cavity 107. Both the waterproof joint 106a and the waterproof joint nut 106b are standard parts, making an assembly process convenient.

Figure 10:
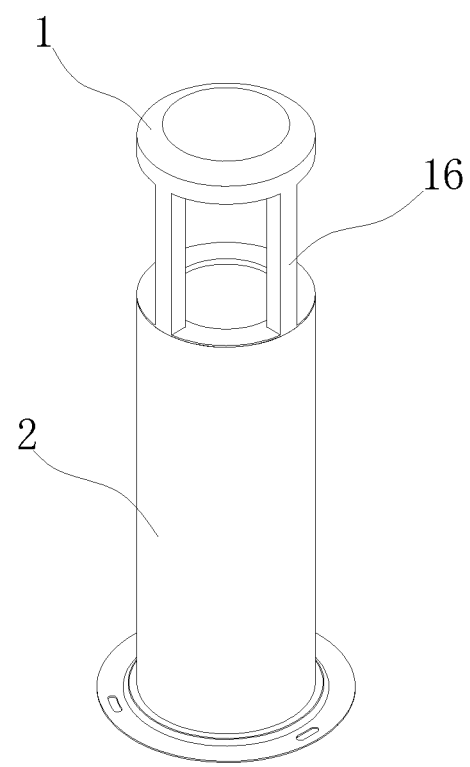
FIG. 10 is an overall view of a lawn lamp having a support member disclosed by an example of the present disclosure.
Figure 11:
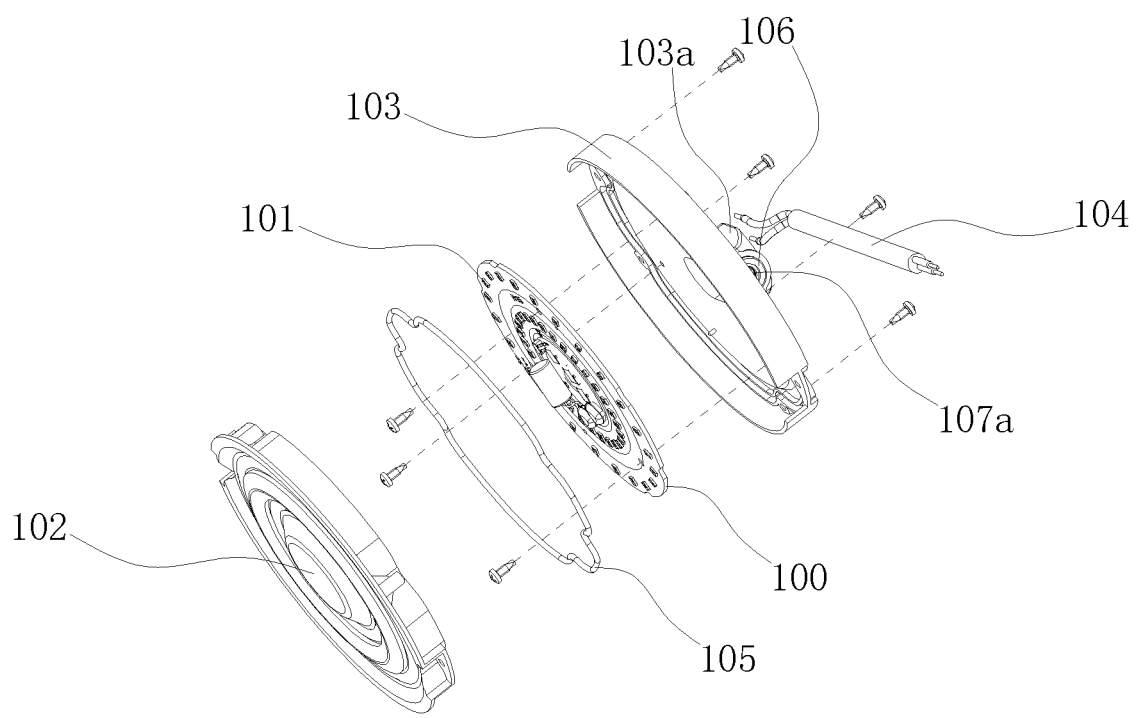
FIG. 11 is an exploded view of a light source module of a lawn lamp in FIG. 10.
Figure 12:
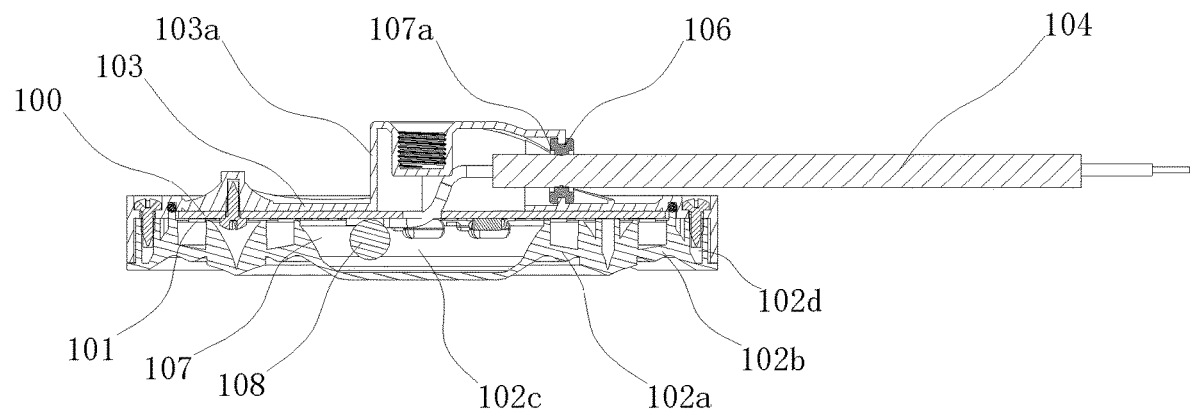
FIG. 12 is a cross-sectional view of a light source module shown in FIG. 11.
Figure 13:
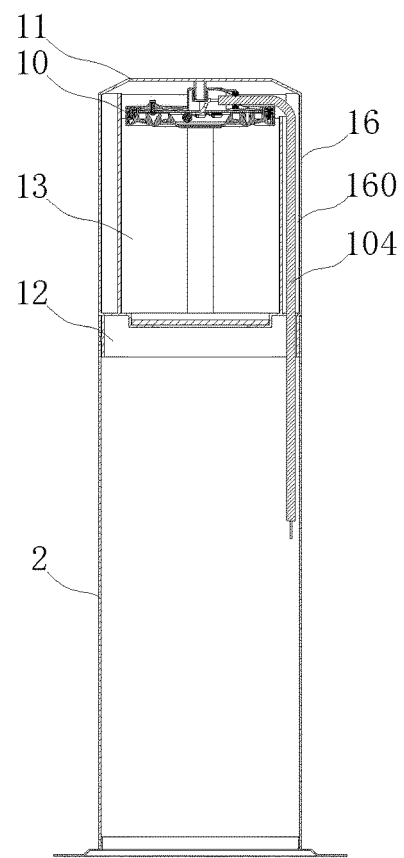
FIG. 13 is a cross-sectional view of a lawn lamp shown in FIG. 10.

In other examples, the cable opening 107a is opened on the bottom cover 103. Such type of light source module 10 may be applied to a lawn lamp having a support member 16. As shown in FIG. 10 and FIG. 13, two ends of the support member 16 are respectively connected with the top cover 11 and the base 12, and meanwhile, the support member 16 is provided therein with a second line channel 160 extending along the direction of the axis center a; one end of the second line channel 160 extends to the top cover 11 and is in communication with the light source cavity 13, while the other end of the second line channel 160 extends to the base 12. The cable 104 from the base 12 may successively pass through the second line channel 160 and the cable opening 107a on the bottom cover 103 to enter the assembly cavity 107. In this way, the cable may be hidden by the support member 16.

Usually, the support member 16 will be arranged at an edge of the light source cavity 13, and the cable 104 needs to extend to the middle of the light source module 10; if the cable opening 107a also extends along the direction of the axis center a, the cable 104 needs to be bent 180° so as to enter the cable opening 107a, and the cable 104 will occupy a lot of space between the cable opening 107a and the second line channel 160. In order to reduce space occupied by the cable 104, in this example, a wiring portion 103a protruding in a direction away from the assembly cavity 107 may be provided in the middle of the bottom cover 103; the cable opening 107a is arranged in the wiring portion 103a; meanwhile, the axis of the cable opening 107a is set to be perpendicular to the axis center a, so that the cable 104 may enter the cable opening 107a along the radial direction of the axis center a, reducing space occupied by the cable 104. At this time, the cable opening 107a may still be sealed by the waterproof joint 106a and the waterproof joint nut 106b; however, since they are standard parts and have relatively large sizes themselves, a size of the wiring portion 103a will increase to occupy more space. Therefore, when the cable opening 107a is arranged on the wiring portion 103a, such type of sealing structure is not recommended. At this time, the cable opening 107a may be sealed directly by an unconventional means such as waterproof sealant; and such a sealing mode may not be affected by the size of the cable opening 107a itself, which is more space-saving.

At an ex-factory stage, the light source module 10 may reserve thinner regions in the middle of the light distributing component 102 and on the wiring portion 103a at a same time without directly opening the cable opening 107a; during an assembly process of the lawn lamp, which thinner region to be punched through may be chosen according to an actual structure of the lawn lamp, so as to form the cable opening 107a, and in this way, applicability of the light source module 10 may be further improved.

The light distributing component, the light source module, the lawn lamp cap, and the lawn lamp disclosed by the examples of the present disclosure may adopt a same type of light source module to meet light-emitting requirements of the lawn lamp in both the direct light-emitting mode and the 360-degree uniform light-emitting mode, which, thus, may reduce investment in production lines and save production costs.

The present disclosure provides a light distributing component, a light source module, a lawn lamp cap and a lawn lamp.

At a first aspect, an example of the present disclosure provides a light distributing component, the light distributing component comprises an inner ring polarizing lens and an outer ring polarizing lens; the inner ring polarizing lens and the outer ring polarizing lens have a common axis center, and the outer ring polarizing lens surrounds the inner ring polarizing lens; the inner ring polarizing lens is configured to deflect light of a light-emitting unit toward a direction close to the axis center, a midline of an illumination range of the inner ring polarizing lens and the axis center form a first included angle, and the first included angle is an acute angle; and the outer ring polarizing lens is configured to deflect light of the light-emitting unit in a direction away from the axis center, a midline located in an illumination range of the outer ring polarizing lens and the axis center form a second included angle, and the second included angle is an acute angle.

In one example mode, in the above light distributing component, the first included angle is 10° to 15°, and/or the second included angle is 10° to 15°.

In one example mode, the above light distributing component further comprises a mounting portion, the mounting portion surrounds the outer ring polarizing lens; and the mounting portion is a threaded hole.

In one example mode, the above light distributing component further comprises a first accommodating portion, the inner ring polarizing lens surrounds the first accommodating portion; a cable opening is provided in the first accommodating portion; and an axis of the cable opening is parallel to the axis center.

At a second aspect, an example of the present disclosure provides a light source module, the light source module comprises a substrate, light-emitting units and the light distributing component; the substrate has a first surface and a second surface that face away from each other, and the light-emitting units are arranged in a ring shape on the first surface; the light distributing component covers the first surface; and the inner ring polarizing lens and/or the outer ring polarizing lens distribute light of the light-emitting units.

In one example mode, in the above light source module, all of the light-emitting units are performed a light distributing by the inner ring polarizing lens; or all of the light-emitting units are performed a light distributing by the outer ring polarizing lens; or a portion of the light-emitting units are performed a light distributing by the inner ring polarizing lens, and an other portion of the light-emitting units are performed a light distributing by the outer ring polarizing lens.

In one example mode, the above light source module further comprises a bottom cover and a cable; the bottom cover and the light distributing component jointly enclose to form an assembly cavity; the substrate and the light-emitting units are both arranged within the assembly cavity; the assembly cavity is opened with a cable opening in communication with an outside; and the cable extends into the assembly cavity from the cable opening and is electrically connected with the substrate.

In one example mode, the above light source module further comprises a power drive module, and the power drive module is arranged within the assembly cavity and is electrically connected with the substrate.

In one example mode, under a condition that the light distributing component further comprises the first accommodating portion and the inner ring polarizing lens surrounds the first accommodating portion, the first accommodating portion is a portion of the assembly cavity, and the power drive module is arranged on the first surface and is located within the first accommodating portion.

In one example mode, in the above light source module, the bottom cover further includes a second accommodating portion, the second accommodating portion is a portion of the assembly cavity, and the power drive module is arranged on the second surface and is located within the second accommodating portion.

In one example mode, the above light source module further comprises a waterproof member, and the waterproof member seals a gap between the cable and the cable opening.

In one example mode, in the above light source module, under a condition that the light distributing component further comprises a first accommodating portion and the inner ring polarizing lens surrounds the first accommodating portion, the cable opening is opened in the first accommodating portion, an axis of the cable opening is parallel to the axis center; and the waterproof member includes a waterproof joint and a waterproof joint nut in threaded cooperation.

In one example mode, in the above light source module, the cable opening is opened in the bottom cover; a middle portion of the bottom cover has a wiring portion protruding in a direction away from the assembly cavity; the cable opening is opened in the wiring portion; an axis of the cable opening is perpendicular to the axis center; and the waterproof member is waterproof sealant.

In one example mode, the above light source module further comprises a seal ring, and the seal ring seals a joint between the bottom cover and the light distributing component.

At a third aspect, an example of the present disclosure provides a lawn lamp cap, the lawn lamp cap comprises a top cover, a base and the light source module; the top cover and the base are arranged opposite to each other; a region enclosed by the top cover and the base is a light source cavity; the light source module is arranged at an end of the light source cavity that is close to the top cover; and a first surface faces the base.

In one example mode, the above lawn lamp cap further comprises a cylindrical lampshade, two ends of the cylindrical lampshade are respectively connected with the top cover and the base; the cylindrical lampshade is made of a transparent material; the lawn lamp cap further comprises a decorative column, the decorative column is arranged inside the light source cavity and is located between the light distributing component and the base; the decorative column is a reflector, and a size of the reflector in a radial direction of the axis center is tapered from an end close to the base to an end close to the light distributing component; the reflector is in a horn shape; under a condition that the light distributing component further comprises a first accommodating portion and the inner ring polarizing lens surrounds the first accommodating portion, the cable opening is opened in the first accommodating portion, and an axis of the cable opening is parallel to the axis center, a first line channel extending along a direction of the axis center is provided in a middle of the decorative column; and the cable passes through the first line channel.

In one example mode, in the above lawn lamp cap, the cylindrical lampshade is a diffusion shade.

In one example mode, in the above lawn lamp cap, under a condition that the cable opening is opened in the bottom cover, the lawn lamp cap further comprises a support member; two ends of the support member are respectively connected with the top cover and the base; a second line channel extending along a direction of the axis center is disposed inside the support member; an end of the second line channel extends to the top cover and is in communication with the light source cavity, an other end of the second via channel extends to the base; and the cable passes through the second line channel.

At a fourth aspect, an example of the present disclosure provides a lawn lamp, the lawn lamp comprises a lamp body and the lawn lamp cap, and the lamp body is detachably connected with the base.

In one example mode, in the above lawn lamp, a sleeve-joint hole is disposed at an top end of the lamp body; an end of the base that faces away from the top cover is an insertion end; the insertion end is insertable into the sleeve-joint hole; and a stopper is arranged on a circumferential surface of the base; under a condition that the insertion end is inserted into the sleeve-joint hole, an edge of the sleeve-joint hole abuts against the stopper.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above examples of the application focus on the differences between the examples. The different optimization features between the examples can be combined to form a better example as long as the different optimization features between the examples are not contradictory, which will not be repeated here for conciseness.

What are described above is related to the examples of the present disclosure only and not limitative to the present disclosure. Various modification and change may be made by those skilled in the art. Any modification, equivalent replacement and modification made within the spirit and principle of the present disclosure are regarded as falling within the protection scope of the present disclosure.

The invention claimed is:

1. A light distributing component comprising an inner ring polarizing lens and an outer ring polarizing lens, wherein:
   the inner ring polarizing lens and the outer ring polarizing lens have a common axis center, and the outer ring polarizing lens surrounds the inner ring polarizing lens;
   the inner ring polarizing lens is configured to deflect light of a light-emitting unit toward a direction close to the axis center, a midline of an illumination range of the inner ring polarizing lens and the axis center form a first included angle, and the first included angle is an acute angle;
   the outer ring polarizing lens is configured to deflect light of the light-emitting unit in a direction away from the axis center, a midline located in an illumination range of the outer ring polarizing lens and the axis center form a second included angle, and the second included angle is an acute angle; and
   the inner ring polarizing lens and the outer ring polarizing lens comprise a groove in a ring shape, and a cross section of the groove along the axis center is of a trapezoid shape.

2. The light distributing component according to claim 1, wherein the first included angle is 10° to 15°, and/or the second included angle is 10° to 15°.

3. The light distributing component according to claim 1, further comprising a mounting portion, wherein:
   the mounting portion surrounds the outer ring polarizing lens; and
   the mounting portion is a threaded hole.

4. The light distributing component according to claim 1, further comprising a first accommodating portion, wherein:
   the inner ring polarizing lens surrounds the first accommodating portion;
   a cable opening is provided in the first accommodating portion; and
   an axis of the cable opening is parallel to the axis center.

5. A light source module comprising a substrate, light-emitting units and a light distributing component, wherein the light distributing component comprises an inner ring polarizing lens and an outer ring polarizing lens, wherein:
   the inner ring polarizing lens and the outer ring polarizing lens have a common axis center, and the outer ring polarizing lens surrounds the inner ring polarizing lens;
   the inner ring polarizing lens is configured to deflect light of a light-emitting unit toward a direction close to the axis center, a midline of an illumination range of the inner ring polarizing lens and the axis center form a first included angle, and the first included angle is an acute angle;
   the outer ring polarizing lens is configured to deflect light of the light-emitting unit in a direction away from the axis center, a midline located in an illumination range of the outer ring polarizing lens and the axis center form a second included angle, and the second included angle is an acute angle;
   the inner ring polarizing lens and the outer ring polarizing lens comprise a groove in a ring shape, and a cross section of the groove along the axis center is of a trapezoid shape;
   the substrate has a first surface and a second surface that face away from each other, and the light-emitting units are arranged in a ring shape on the first surface; and
   the light distributing component covers the first surface; and the inner ring polarizing lens and/or the outer ring polarizing lens distribute light of the light-emitting units.

6. The light source module according to claim 5, wherein:
   light emitted by all of the light-emitting units are distributed by the inner ring polarizing lens; or
   light emitted by all of the light-emitting units are distributed by the outer ring polarizing lens; or
   light emitted by a portion of the light-emitting units are distributed by the inner ring polarizing lens, and light emitted by another portion of the light-emitting units are distributed by the outer ring polarizing lens.

7. The light source module according to claim 5, further comprising a bottom cover and a cable; wherein:
   the bottom cover and the light distributing component jointly enclose to form an assembly cavity; the substrate and the light-emitting units are both arranged within the assembly cavity; and
   the assembly cavity is opened with a cable opening in communication with an outside; and the cable extends into the assembly cavity from the cable opening and is electrically connected with the substrate.

8. The light source module according to claim 7, further comprising a power drive module, wherein the power drive module is arranged within the assembly cavity and is electrically connected with the substrate.

9. The light source module according to claim 8, wherein, under a condition that the light distributing component further comprises the first accommodating portion and the inner ring polarizing lens surrounds the first accommodating portion, the first accommodating portion is a portion of the assembly cavity, and the power drive module is arranged on the first surface and is located within the first accommodating portion.

10. The light source module according to claim 8, wherein the bottom cover further includes a second accommodating portion, the second accommodating portion is a portion of the assembly cavity, and the power drive module is arranged on the second surface and is located within the second accommodating portion.

11. The light source module according to claim 7, further comprising a waterproof member, wherein the waterproof member seals a gap between the cable and the cable opening.

12. The light source module according to claim 11, wherein:
   under a condition that the light distributing component further comprises a first accommodating portion and the inner ring polarizing lens surrounds the first accommodating portion, the cable opening is opened in the first accommodating portion, an axis of the cable opening is parallel to the axis center; and
   the waterproof member includes a waterproof joint and a waterproof joint nut in threaded cooperation.

13. The light source module according to claim 11, wherein:
   the cable opening is opened in the bottom cover;
   a middle portion of the bottom cover has a wiring portion protruding in a direction away from the assembly cavity; the cable opening is opened in the wiring portion; an axis of the cable opening is perpendicular to the axis center; and the waterproof member is waterproof sealant.

14. The light source module according to claim 7, further comprising a seal ring, wherein the seal ring seals a joint between the bottom cover and the light distributing component.

15. A lawn lamp cap comprising a top cover, a base and a light source module; wherein the light source module comprises a substrate, light-emitting units and a light distributing component, wherein the light distributing component comprises an inner ring polarizing lens and an outer ring polarizing lens, wherein:

the inner ring polarizing lens and the outer ring polarizing lens have a common axis center, and the outer ring polarizing lens surrounds the inner ring polarizing lens;

the inner ring polarizing lens is configured to deflect light of a light-emitting unit toward a direction close to the axis center, a midline of an illumination range of the inner ring polarizing lens and the axis center form a first included angle, and the first included angle is an acute angle;

the outer ring polarizing lens is configured to deflect light of the light-emitting unit in a direction away from the axis center, a midline located in an illumination range of the outer ring polarizing lens and the axis center form a second included angle, and the second included angle is an acute angle;

the inner ring polarizing lens and the outer ring polarizing lens comprise a groove in a ring shape, and a cross section of the groove along the axis center is of a trapezoid shape;

the substrate has a first surface and a second surface that face away from each other, and the light-emitting units are arranged in a ring shape on the first surface;

the light distributing component covers the first surface; and the inner ring polarizing lens and/or the outer ring polarizing lens distribute light of the light-emitting units; and the top cover and the base are arranged opposite to each other; a region enclosed by the top cover and the base is a light source cavity; the light source module is arranged at an end of the light source cavity that is close to the top cover; and a first surface faces the base.

16. The lawn lamp cap according to claim 15, further comprising a cylindrical lampshade, wherein:

two ends of the cylindrical lampshade are respectively connected with the top cover and the base; and the cylindrical lampshade is made of a transparent material;

the lawn lamp cap further comprises a decorative column, and the decorative column is arranged inside the light source cavity and is located between the light distributing component and the base;

the decorative column is a reflector, and a size of the reflector in a radial direction of the axis center is tapered from an end close to the base to an end close to the light distributing component;

the reflector is in a horn shape; and under a condition that the light distributing component further comprises a first accommodating portion and the inner ring polarizing lens surrounds the first accommodating portion, a cable opening is opened in the first accommodating portion, and an axis of the cable opening is parallel to the axis center, a first line channel extending along a direction of the axis center is provided in a middle of the decorative column; and a cable passes through the first line channel.

17. The lawn lamp cap according to claim 16, wherein the cylindrical lampshade is a diffusion shade.

18. The lawn lamp cap according to claim 15, wherein, under a condition that the cable opening is opened in a bottom cover, the lawn lamp cap further comprises a support member; two ends of the support member are respectively connected with the top cover and the base; a second line channel extending along a direction of the axis center is disposed inside the support member; an end of the second line channel extends to the top cover and is in communication with the light source cavity, another end of the second via channel extends to the base; and the cable passes through the second line channel.

19. The lawn lamp cap according to claim 15, wherein the lawn lamp cap is comprised in a lawn lamp wherein the lawn lamp comprises a lamp body, and the lamp body is detachably connected with the base.

20. The lawn lamp cap according to claim 19, wherein a sleeve-joint hole is disposed at an top end of the lamp body; an end of the base that faces away from the top cover is an insertion end; the insertion end is insertable into the sleeve-joint hole; and a stopper is arranged on a circumferential surface of the base; under a condition that the insertion end is inserted into the sleeve-joint hole, an edge of the sleeve-joint hole abuts against the stopper.

* * * * *